Dec. 10, 1935.　　　　R. M. NARDONE　　　　2,024,109
ENGINE STARTER
Filed April 30, 1932　　　2 Sheets-Sheet 2
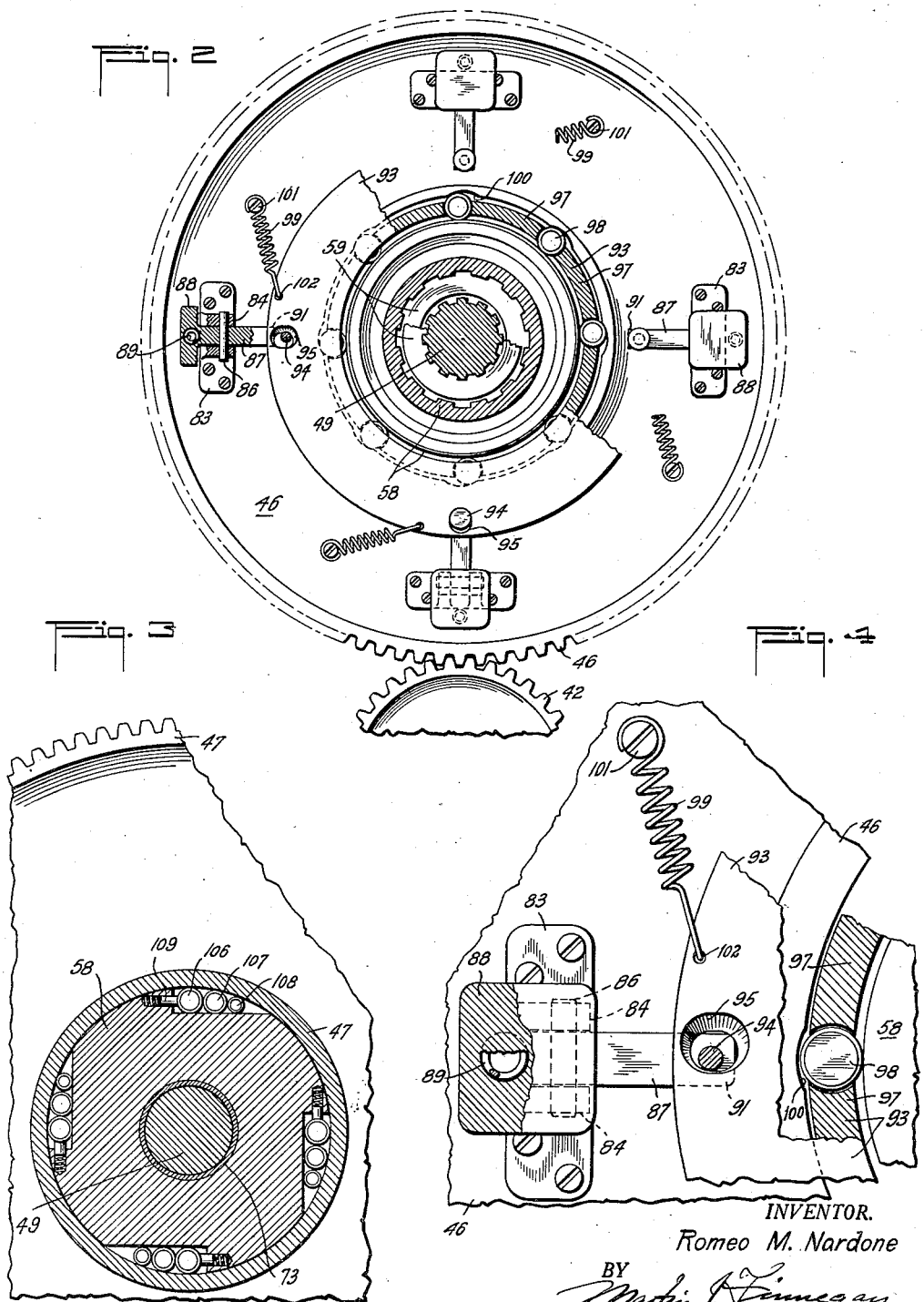
INVENTOR.
Romeo M. Nardone
BY
ATTORNEY.

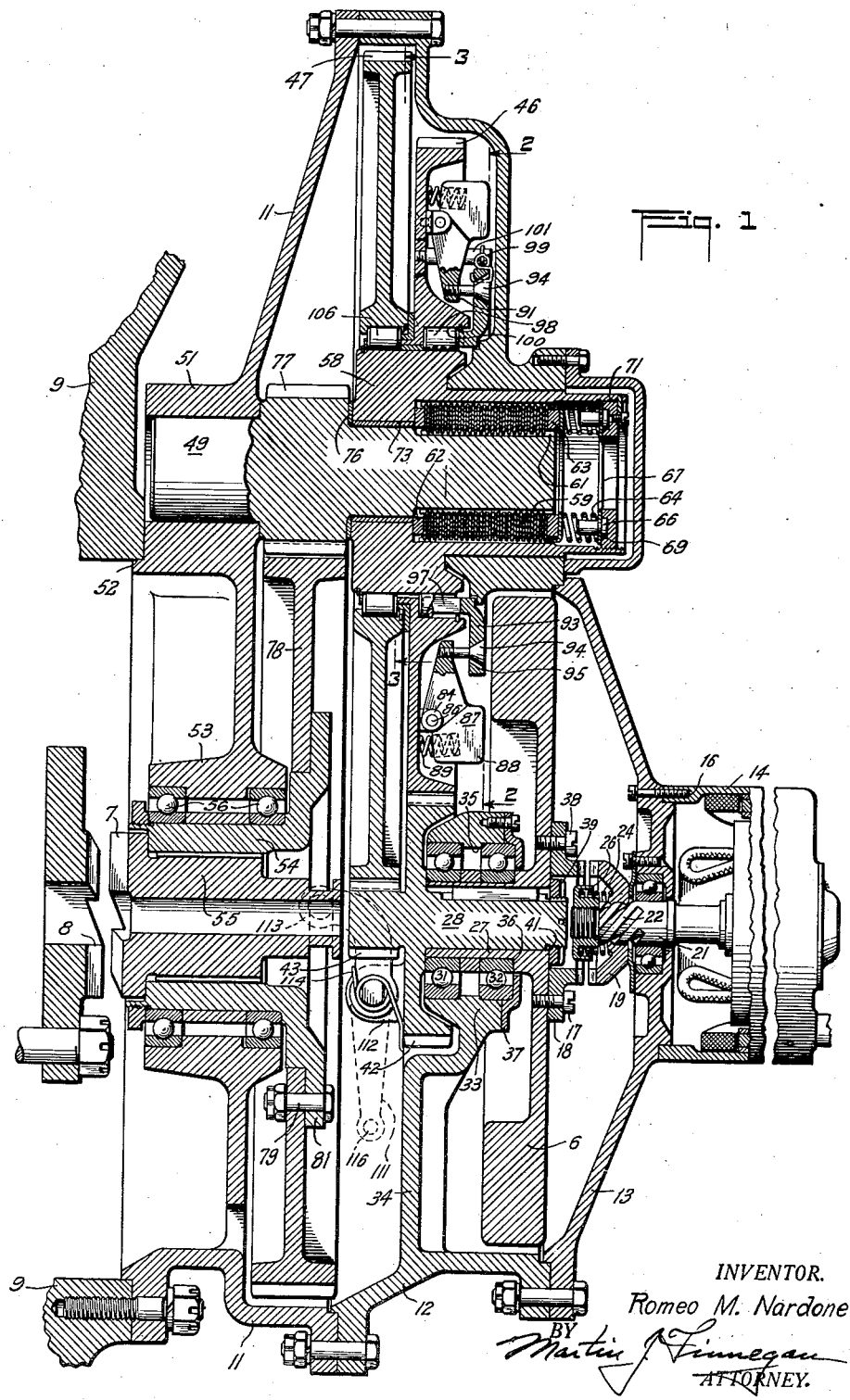

Patented Dec. 10, 1935

2,024,109

UNITED STATES PATENT OFFICE 2,024,109

ENGINE STARTER

Romeo M. Nardone, East Orange, N. J., assignor, by mesne assignments, to Eclipse Aviation Corporation, East Orange, N. J., a corporation of New Jersey Application April 30, 1932, Serial No. 608,520

7 Claims. (Cl. 123—179)

This invention relates to engine starters, and more particularly to starters of the character wherein the engine-engaging member is rotated by a variable speed driving member.

An object of the invention is to provide in an engine starting apparatus of the foregoing character, novel means for varying the driving ratio in accordance with variations in the speed of the driving member.

In engine starters of certain types, as for example inertia starters, wherein the energy stored in a rapidly rotating flywheel is applied to an engine-engaging member for cranking purposes, it is customary to employ a relatively high reduction gear train in order to step-down the extraordinarily high flywheel speed of only a few hundred R. P. M. on the part of the engine-engaging member and thus facilitate proper mesh of the latter with the stationary engine member to be engaged. The engaging and engaged members customarily employed in inertia starters are of such type that difficulty is encountered in meshing one with the other under load at a difference in speed of more than a few hundred R. P. M. without causing serious injury to one or the other of such parts.

The above described difficulty in utilizing the relatively great energy which may be stored in a comparatively light flywheel by accelerating the latter to an extraordinarily high speed, has heretofore brought about the use, in conjunction with the reduction gearing, of a torque limiting clutch adapted to absorb the tremendous initial shock by slipping momentarily, thus permitting a smoother initial turning action. This of course entails the loss of a considerable amount of the flywheel's energy and such lost energy, coupled with the energy lost in accelerating the engine from rest to a suitable firing speed, has made it necessary to employ a flywheel of larger mass and inertia effect than would otherwise be necessary, in order that the energy remaining after the losses above mentioned, shall be sufficient to complete the cranking operation, through the high reduction ratio which converts the already materially reduced speed of the flywheel into a cranking speed which would otherwise be too low to be effective. It follows that the provision of gear shifting means acting to change the initial high reduction ratio to a lower ratio, once the engine has been accelerated to a certain intermediate speed, would serve to increase the speed of rotation of the engine-engaging member (after there is no longer any danger of tooth breakage) and thus make it possible to utilize substantially all the energy previously stored in the flywheel for completion of the cranking operation. The provision of such gear shifting means would have the further advantage of making possible the use of a flywheel of considerably smaller dimensions, because of the greater efficiency in the utilization of the energy stored therein. It is accordingly an object of the present invention to provide means for increasing the cranking speed of the engine-engaging member of a starter of the foregoing character, by changing the gear ratio between the inertia element and the engine-engaging member after the cranking operation has proceeded through the first, or greatest resistance stage.

In the embodiment of the invention herein illustrated, such ratio changing is effected by the use of a novel centrifugally acting clutch mechanism operating to render effective a portion of the gear train (not participating in the first stage of the cranking operation) and acting in conjunction with an overrunning clutch mechanism to eliminate a portion of the gear train theretofore used; such centrifugally acting mechanism being operative automatically in response to a definite degree of deceleration of the inertia member, or flywheel.

Generally stated, however, it is to be understood that the mechanism herein illustrated is merely representative of any equivalent form of ratio changing device, operating at a predetermined stage in the cranking operation to produce a definite change in reduction ratio between a starter flywheel, or other variable speed driving member, and the engine crankshaft. The form of the invention shown in the drawings, therefore, is not to be construed as a limitation of the scope of the invention in any respect in which the appended claims are of broader scope.

In the drawings,

Fig. 1 is a central sectional view of the device embodying the invention;

Fig. 2 is a transverse sectional view taken substantially along the line 2—2 of Fig. 1;

Fig. 3 is a transverse sectional view taken along the line 3—3 of Fig. 1; and

Fig. 4 is an enlarged detail view of a portion of the speed responsive mechanism with certain parts in section, and in relative positions varying from those indicated in Fig. 2.

Referring to the drawings, there is disclosed therein a flywheel 6 adapted to drive an engine-engaging member shown in the form of a jaw clutch 7 normally out of engagement with, but movable axially to mesh with a corresponding jaw clutch member 8 integral or connecting with the crankshaft of the engine to be started, a portion of the crankcase therefor being indicated at 9. The mechanism, including the gear trains which drivably connect the flywheel 6 with the engine-engaging member 7, is shown as housed within a suitable casing constituted by an inner section 11, an intermediate section 12, and an outer section 13 to the central portion of which a motor 14 (if the flywheel is motor actuated) is attached by suitable screws 16 prior to the attachment of the section 13 to the section 12. The flywheel may be energized by any suitable means, but when the electric motor 14 is employed as the energizing instrumentality, there is preferably secured to the flywheel, by suitable means 17, a clutch element 18 adapted to be engaged by corresponding clutch element 19, mounted on the extending portion 21 of the armature shaft of th emotor 14, which portion 21 is preferably threaded or spirally splined as indicated at 22; the clutch element 19 having corresponding threads or splines whereby rotation of the shaft produces a forward movement of the element 19 into driving relation with the corresponding clutch element 18. Normally the member 19 is held in the disengaged position by suitable means which, as shown, takes the form of a spring 24 held in place by a cup 26 fixed in any suitable manner to the shaft 21.

Preferably the flywheel 6 has an extending hub 27 keyed to the shaft 28 and rotatably supported by a pair of laterally spaced bearings 31 and 32, contained in a boss 33 which may be formed integrally with the transversely extending diaphragm or partition 34 which, as shown, is integral with the outer wall of the casing section 12. The bearing assemblies are held in place by suitable means which, as shown, includes shoulders 35 and 36 formed on the boss 33 and flywheel hub 27 respectively, and a retaining plate 37 held to the boss 33 by suitable screws 38. A nut engaging the threaded end 41 of the shaft 28 serves to hold the shaft 28 against axial displacement in one direction relative to the flywheel 6, while the pinion 42 prevents such axial displacement in the opposite direction by virtue of its being integral with the shaft 28 and held in abutting relation with the inner face of the bearing 31 by the adjustment of nut 39. Also integral with the shaft 28 is a second pinion 43 of considerably smaller diameter, the pinions 42 and 43 being shown as permanently meshed with a pair of gears 46 and 47 respectively. The gears 46 and 47 are both shown as rotatable about the axis of shaft 49 journalled at one end in a boss 51 extending from the casing section 11 in a direction toward the engine crankcase 9 and as shown, interlocking with said crankcase as indicated at 52; the boss 51 being laterally offset from a boss 53 provided with bearings 56 in which is journalled a sleeve 54 splined or otherwise drivably connected with the rearwardly extending cylindrical portions 55 of the engine engaging clutch element 7. The shaft 49 forms part of the driving connection between the flywheel 6 and the parts 54 and 55 just described, the drive being transmitted to the shaft 49 by way of one or the other of gears 46—47 and a shouldered sleeve or barrel 58 surrounding the shaft 49 and adapted to have a yielding driving connection therewith, through the provision of a suitable torque limiting clutch which, in the form shown, includes a plurality of annular friction discs 59 having connection alternately with the splined inner surface of the sleeve 58 and the splined portion 61 of the shaft 49.

As shown the clutch discs are held in frictional engagement by the provision of annular pressure plates 62 and 63 at opposite ends of the disc assembly; the pressure maintained on the plates being adjustable by the provision of a series of coiled compression springs 64 disposed at intervals of equal distances from the axis of the shaft 49 and adjustably held in place by the provision of pins 66 extending inwardly from a retaining ring 67 which is in turn secured in place by the pressure of adjusting ring 69 threadedly engaging the sleeve 58 near its outer end as indicated at 71. A friction reducing sleeve 73 may, if desired, be interposed between the shaft 49 and the sleeve 58 to facilitate relative rotation therebetween when the clutch discs slip upon application of excessive load. A similar friction reducing washer 76 may be interposed between the end of sleeve 58 and the toothed portion 77 of the shaft 49; said toothed portion constituting a pinion meshing with a spur gear 78 connected by suitable means 79 to a radially extending flange 81 on the above described sleeve 54.

In the embodiment herein shown the gear combinations 43—47, and 42—46 are intended to operate alternately to connect the flywheel 6 with the engine-engaging member 7 and are intended to represent any suitable pair of alternately operable gear trains of different driving ratios to which the novel mechanism of the present invention may be applied to render them successively effective to drive the engine-engaging member 7, first at one reduction ratio, and then at a different reduction ratio, which in turn bears a definite ratio to the first.

In furtherance of this end, the gear 46 has riveted or otherwise secured to its lateral surface at equal angular intervals along a circle concentric with its periphery, a plurality of plates 83 on which are formed brackets 84 journally receiving the pins 86 extending through transversely disposed openings in a corresponding plurality of weights 87 of greater mass at the portions remote from the axis of rotation, as indicated at 88, the said portions 88 being recessed to receive compression springs 89, the opposite ends of which abut the face of the gear 46, and thus tend to hold the weights in the position indicated in Figs. 1 and 2 against the action of centrifugal force which tends to swing these weights in a direction such as to move the inner ends 91 to the right, as viewed in Fig. 1 and thus permit a corresponding movement of cage 93 with which the inner portions 91 of the weights are operatively linked through suitable means as indicated at 94. As shown best in Figs. 1 and 4, the cage 93 has conical openings 95 at the points through which the members 94 pass and the latter have corresponding conical heads permitting the movement thereof relative to the cage. Normally the cage 93 rotates in unison with the gear 46 to which it is secured through the connecting axially extending fingers 97 (Fig. 1) between which are mounted rollers 98 received in pockets 100 provided by recessing the inner surface of the gear 46. As shown the rollers are cylindrical in shape but it is to be understood that they may have other shapes such as the spherical, and the claims are to be so interpreted. Springs 99, anchored to pins 101 extending outwardly from the gear 46 and hooked at their opposite ends to the cage 93 as indicated at 102, tend to draw the cage 93 in a clockwise direction relative to the gear 46, as viewed in Fig. 2, and thus draw the rollers 98 toward the centers of the pockets 100 formed between the gear 46 and the sleeve 58, but such tendency is unavailing so long as the position of the weights 88 is such as to hold the conical heads of the pins 94 in firm engagement with the conical seats in the cage 93.

In order to eliminate the drive from the gear 47 to the sleeve 58 when the rollers 98 become effective to key the gear 46 to the sleeve 58, an overrunning clutch of any suitable construction is interposed between the members 47 and 58. As shown in Fig. 3 such clutch may take a conventional form involving a plurality of rollers 106, 107 and 108 of graduated sizes, normally pressed into engagement with both the recessed surfaces of the sleeve 58 and the inner-cylindrical surface of the hub of the gear 47, by the provision of spring pressed plungers 109, which plungers are however yieldable to permit free rotation of the rollers when the rotary speed of the sleeve 58 tends to exceed that of the gear 47.

Any suitable means may be employed for moving the jaw clutch 7 into engagement with the engine member 8 after the flywheel has been sufficiently accelerated, but as shown in Fig. 1, the means employed herein includes lever 111 pivoted to a suitable support 112 extending from the wall of the casing section 12 and having a yoked formation 113 for operative connection with an annular groove provided in the rearwardly extending portion 55 of the jaw clutch element 7; a torsion spring 114 being provided to exert a force tending to hold the clutch in the disengaged position, said spring being yieldable to permit forward movement of the clutch in response to manual operation of the lever 111 through suitable linkage (not shown) connected with the lower end 116 thereof.

Having thus described the parts entering into the preferred embodiment of the invention as herein disclosed, it will be apparent that upon energization of the motor 14, the clutch elements 19 and 18 coact to impart a high momentum to the flywheel 6, the gears 46 and 47 rotating idly, there being no connection with the engine and hence no appreciable load during this period of flywheel acceleration. When sufficient energy has been stored in the flywheel, the motor is preferably deenergized and the element 19 is automatically retracted due to the clutch construction heretofore described. Then, upon actuation of the lever 111 to mesh jaw clutch 7 with the engine member 8, the energy of the flywheel is effective to start the engine member 8 in rotation. Since the gear 46 is now rotating at a maximum speed, the weights 88 and pins 94 are in their outermost positions, and the springs 99 are accordingly effective to maintain the rollers 98 in the central positions as indicated in Fig. 4, in which positions free relative rotation between the gear 46 and the sleeve 58 is possible.

After the energy transferred from the flywheel to the engine has brought about a reduction in the flywheel speed to the point at which the springs 89 become effective, the resulting inwardly directed pull on the pins 94 turns the cage 93 relatively to the gear 46 sufficiently to engage the rollers 98 with the surfaces of both the gear 46 and the sleeve 58, with the result that the latter is now driven at a higher speed than gear 47, thus causing the rollers 106, 107 and 108 to overrun the gear 47. The reduction ratio from the flywheel 6 to the crankshaft is thus definitely changed, with a resulting acceleration of the crankshaft and thus a more effective utilization of the energy remaining in the flywheel.

There is thus provided, in the present invention, a novel mechanism wherein the speed of rotation of the engine-engaging member is definitely increased relative to the speed of the driving member at an intermediate stage in the cranking operation. Novel speed responsive means have been provided for effecting this change in driving ratio, which speed responsive means is believed to involve novelty per se, and, in itself forms the subject matter of claims in my co-pending application No. 728,794, filed June 2, 1934.

It is to be understood however, that insofar as the invention is considered in its more comprehensive aspect of providing a novel engine starting mechanism and method of operation, the particular speed responsive means shown herein is not indispensable, and may be replaced by equivalent speed responsive mechanisms. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In an engine starter, an engine-engaging member, a driving member, means including a pair of clutches drivably connecting said driving member with said engine-engaging member, means for rendering one of said clutches effective upon deceleration of said driving member to a predetermined speed to accelerate said engine-engaging member to a speed which renders the other of said clutches ineffective, a third clutch for limiting the torque transmitting capacity of both said first named clutches, all of said clutches being rotatable about a common axis, and a single member connecting both said first named clutches with said torque limiting clutch.

2. In a device of the class described, a member to be driven, a driving member surrounding said first named member but spaced therefrom, means including a plurality of rollers for drivably connecting said members, speed responsive means mounted on said driving member and operative to move said rollers into and out of operative engagement with both said members, a second driving member surrounding said driven member, and a one-way clutch for establishing a driving connection between said second driving member and said driven member.

3. In a device of the class described, a member to be driven, a driving member surrounding said first named member but spaced therefrom, means including a plurality of rollers for drivably connecting said members, speed responsive means mounted on said driving member and operative to move said rollers into and out of operative engagement with both said members, a second driving member surrounding said driven member, and a one-way clutch for establishing a driving connection between said second driving member and said driven member, only while said rollers are in the disengaged position.

4. In a device of the class described, a member to be driven, a driving member coaxial with said first named member but spaced therefrom, means including a plurality of rollers for drivably connecting said members, speed responsive means mounted on said driving member and operative to move said rollers into and out of operative engagement with both said members, a second driving member coaxial with said driven member, and a one-way clutch for establishing a driving connection between said second driving member and said driven member.

5. In a device of the class described, a member to be driven, a driving member coaxial with said first named member but spaced therefrom, means including a plurality of rollers for drivably connecting said members, speed responsive means mounted on said driving member and operative to move said rollers into and out of operative engagement with both said members, a second driving member coaxial with said driven member, and a one-way clutch for establishing a driving connection between said second driving member and said driven member, only while said rollers are in the disengaged position.

6. In a device of the class described, a member to be driven, a driving member coaxial with said first named member but spaced therefrom, means including a plurality of rollers for drivably connecting said members, speed responsive means associated with said driving member and operative to move said rollers into and out of operative engagement with both said members, a second driving member coaxial with said driven member, and a one-way clutch for establishing a driving connection between said second driving member and said driven member, only while said rollers are in the disengaged position.

7. In a device of the class described, a member to be driven, a driving member surrounding said first named member but spaced therefrom, means including a plurality of rollers for positively connecting said members, speed responsive means mounted on said driving member and operative to move said rollers into and out of operative engagement with both said members, a second driving member surrounding said driven member, and a one-way clutch for establishing a positive driving connection between said second driving member and said driven member.

ROMEO M. NARDONE.